United States Patent

[11] 3,540,577

| [72] | Inventors | Quirino A. Trementozzi;<br>Yoon Chai Lee, Springfield, Massachusetts |
|---|---|---|
| [21] | Appl. No. | 648,223 |
| [22] | Filed | June 23, 1967 |
| [45] | Patented | Nov. 17, 1970 |
| [73] | Assignee | Monsanto Company<br>St. Louis, Missouri<br>a corporation of Delaware |

[54] INTERPOLYMERS OF METHACRYLONITRILE AND LOWER ALPHA-OLEFINS AND PACKAGING MATERIALS PREPARED THEREFROM
7 Claims, No Drawings

[52] U.S. Cl. .................................................. 206/46,
99/171; 215/1; 260/4, 85.5, 876, 878, 879
[51] Int. Cl. ........................................................ B65b 29/00;
C08f 39/00
[50] Field of Search............................................ 260/876,
879, 878; 206/85.5, 46

[56] References Cited
UNITED STATES PATENTS

| 2,531,196 | 11/1950 | Brubaker et al. .............. | 260/85.5 |
|---|---|---|---|
| 2,537,626 | 1/1951 | Eberly et al. ................... | 260/85.5X |
| 2,802,809 | 8/1957 | Hayes ............................ | 260/876X |
| 3,183,217 | 5/1965 | Serniuk et al. ................ | 260/85.5 |
| 3,252,933 | 5/1966 | Kim et al. ...................... | 260/85.5X |
| 3,253,058 | 5/1966 | Isley et al. ..................... | 260/85.5X |
| 3,337,650 | 8/1967 | Marcil .......................... | 260/880 |
| 3,451,538 | 6/1969 | Trementozzi ................. | 260/4 |

*Primary Examiner*—Murray Tillman
*Assistant Examiner*—M. J. Tully
*Attorneys*—Paul L. Passley, Arthur E. Hoffman and H. B. Roberts ABSTRACT: Disclosed herein are interpolymers of methacrylonitrile and lower alphaolefins of 2—8 carbon atoms, graft copolymers onto a rubber thereof, and blends of these materials. The compositions are useful as packaging materials which have excellent clarity, are easily processable and have oxygen permeability of less than 6.5 c.c./100 sq. in. 24 hr. atmos. mil at 73°F. and water vapor transmission of less than 8.5 gms./24 hr. 100 sq.in. mil at 100°F. and 95 percent R.H.

INTERPOLYMERS OF METHACRYLONITRILE AND LOWER ALPHA-OLEFINS AND PACKAGING MATERIALS PREPARED THEREFROM

BACKGROUND OF THE INVENTION

1. Field of the Invention

This invention relates to novel packaging materials and the composition of matter upon which they are based. More particularly, it relates to novel packaging materials based upon methacrylonitrile with lower alpha-olefins of from two to eight carbon atoms, said packaging materials having improved resistance to oxygen permeability and water vapor transmission, improved color, and further exhibiting excellent processing properties.

2. Description of the Prior Art

The currently available synthetic polymers which are used in the preparation of packaging materials for food stuffs, medicines, and related substances are characterized by one or more serious deficiencies which detract from their packaging utility. Most synthetic polymers with good thermoforming or processing characteristics have a high rate of oxygen permeability and water vapor transmission so that foods and medicines packaged in these materials suffer water gain or loss, oxidation, discoloration, loss of taste, aroma, etc., thereby losing their customer appeal. Vinylidene copolymers have sufficient oxygen impermeability to permit their use in some food-packaging applications. However, the use of these materials have been largely confined to film applications because of the processing difficulties encountered in forming thick-walled objects. These vinylidene copolymers have poor heat seal characteristics, poor draw properties, low heat distortion temperatures and thermoforming stability, low modulus and low strength which seriously limits their widespread use. Other polymer systems such as fully hydrolyzed polyvinyl alcohol have very high resistance to oxygen permeability but these systems have serious deficiencies in that they are water sensitive and have a very high water vapor transmission rate. These polyvinyl alcohol polymers fail to retain their excellent resistance to oxygen permeability at conditions of high humidity and further, have poor processing characteristics in general.

A definite need exists for a new class of packaging materials which has a high resistance to oxygen permeability and a low water vapor transmission rate as well as improved processing and physical properties to allow fabrication in diverse shapes and sizes, e.g., bottles, containers, sheets, thin films, etc.

This need was alleviated in part by the use of interpolymers based upon acrylonitrile with certain comonomers wherein the percentage of acrylonitrile ranges from 55 to 90 weight percent. Such interpolymers have been disclosed in U.S. Pat. Ser. No. 544,109, filed April 21, 1966 now abandoned and the continuation-in-part of that case, U.S. Pat. No. 3,451,538. These interpolymers exhibit adequate processing properties on available commercial equipment and excellent oxygen permeability, but tend to develop color during processing which diminish their value as a packaging material for comestibles from an aesthetic standpoint.

SUMMARY OF THE INVENTION

The required degree of oxygen permeability and water vapor transmission (WVT) in a packaging material will vary with the particular food or medicine to be packaged and the storage conditions, e.g., temperature, humidity, ventilation, light-type and intensity, etc. In general, a critical application will require a material with an oxygen permeability below 6.5 cc/100 sq.in. 24 hr. atmos. mil at 73°F. and a WVT of less than 8.5 gms./24 hr. 100 sq.in. mil at 100°F. and 95 percent relative humidity.

This criticality is illustrated in Modern Packaging, March, 1965, "Flexible-Vacuum Performance", page 201 following, wherein the extreme sensitivity of coffee to moisture and oxygen is discussed. The authors of this article state that an increase in the moisture content of coffee of about 1 percent, i.e., from 1.4 to 2.6 percent will cause a stale odor after 20 days, while only 14 cc. of oxygen will cause staling in 1 pound of coffee.

Dairy foods, meat products and some medicines show as much, if not greater, oxygen and moisture sensitivity as coffee and, in some instances, require packaging materials with even greater impermeability to oxygen and water vapor than that required for coffee packaging.

This invention is directed toward furnishing a packaging material of excellent color and clarity designed to meet these more critical packaging requirements.

It is, therefore, an object of this invention to provide a novel packaging material for foods, medicines, and related objects, wherein the packaging materials exhibit a high resistance to oxygen permeability and low water vapor transmission rate as well as improved processing and physical properties.

It is a further object of this invention to provide a process for the preparation of packaging materials for foods, medicines, and related objects, wherein the packaging materials exhibit a high resistance to oxygen permeability and a low water vapor transmission rate as well as improved processing and physical properties.

It is a further object of this invention to provide foods, medicines and related substances which are protected by a novel packaging material which exhibits high resistance to oxygen permeability and a low water vapor transmission rate as well as improved processing and physical properties combined with excellent color and clarity.

It is another object of this invention to provide a composition of matter which may be formed into a packaging material which will accomplish the aforesaid objects.

DESCRIPTION OF THE PREFERRED EMBODIMENTS

The above and other objects are obtained by providing packaging materials for foods, medicines and other related substances wherein the packaging materials exhibit oxygen permeability of less than 6.5 cc/100 sq.in. 24 hr. atmos. mil at 73°F. and water vapor transmission of less than 8.5 gms./24 hr. 100 sq.in. mil at 100°F. and 95 percent relative humidity and based upon a polymerization product of methacrylonitrile and at least one other comonomer wherein the methacrylonitrile constitutes from about 55 to about 98 percent of the packaging material.

The component responsible for the improved barrier properties and improved color and clarity described in this invention is the methacrylonitrile component which must be present in an amount of at least 55 weight percent of the total polymer weight. This is necessary in order to obtain the WVT and oxygen permeability referred to above. These levels of permeance are maximum limits tolerable for use in areas requiring critical barrier properties, product degradation, oxidation or loss of taste and/or aroma is to be avoided. Even within this area, certain products require packaging materials with correspondingly lower oxygen permeability and WVT rates than others.

The weight percent range of methacrylonitrile used in the copolymers of this invention is from 55 to 98 weight percent with 78—98 weight percent preferred.

More particularly the packaging films of this invention are prepared from:

A. The product of the copolymerization of methacrylonitrile and at least one lower alpha-olefin having 2—8 carbon atoms, wherein the methacrylonitrile comprises from about 78 to about 98 weight percent of the copolymer; or B. A blend of A with the product of the graft polymerization onto a rubber of a monomer mixture of 78—98 weight percent methacrylonitrile and, correspondingly, 22—2 weight percent of at least one lower alpha-olefin having 2—8 carbon atoms; the total methacrylonitrile of said blend constituting 55—90 weight percent.

The lower limit of 55 weight percent methacrylonitrile is essential if the packaging material is to be used in the critical packaging applications discussed above. The upper limit of 98 percent is critical in order to maintain the low rate of WVT and to provide a material that is readily processable into bottles, containers, sheets and films and exhibits high clarity, transparency and absence of color. A homopolymer of methacrylonitrile assumes a dark red color upon processing, probably due to degradation. This dark red color is unacceptable for materials to be used in packaging since it does not provide the consumer with a true view of the contents of the package. It is believed that the degradation of polymethacrylonitrile is due to the necessity for high heating upon processing in order to overcome the crystalline forces within the polymer so that a melt can be achieved. It is also believed that the presence of at least one comonomer in the methacrylonitrile copolymers of this invention either prevents long sequences of methacrylonitrile placement which gives rise to crystallinity or minimizes crystal size and perfection; thus a copolymer is provided with a lower melting temperature range and good flow behavior at relatively low temperatures thereby precluding the use of temperatures high enough to cause degradation.

As a result, the copolymers not only exhibit good barrier characteristics but also have the critical properties which allow them to be shaped readily into films and bulky objects which meet the critical packaging requirements of the applications contemplated herein.

The balance of the copolymer is prepared from one or more lower alpha-olefins, of from two to eight carbon atoms which are copolymerizable with methacrylonitrile. Examples of these copolymerizable monomers include ethylene, propylene, butene, pentene, hexene, heptene, octene and isomers thereof. An especially preferred comonomer is isobutylene.

This invention also contemplates the use of a synthetic or natural rubber component such as polybutadiene, isoprene, neoprene, nitrile rubbers, natural rubbers, arcylonitrile-butadiene copolymers, ethylene-propylene copolymers, chlorinated rubbers, etc., which is used to strengthen or toughen the packaging materials prepared from this invention. This rubbery component may be incorporated into the methacrylonitrile-containing polymer by any of the methods which are well known to those skilled in the art, e.g., direct polymerization or monomers, polyblends, grafting the methacrylonitrile monomer mixture onto the rubbery backbone, physical admixtures of the rubbery component, etc. Especially preferred are polyblends derived by mixing a graft copolymer of the methacrylonitrile and comonomer on the rubbery backbone with another copolymer of methacrylonitrile and the same comonomer.

The methcrylonitrile copolymers of this invention may be prepared according to any method well known to those skilled in the art, e.g., by bulk, emulsion, solution, and suspension polymerization methods. They may be prepared with atmospheric, subatmospheric or superatmospheric pressures.

The packaging films prepared from the foregoing polymers may be made by extrusion, pressing, calendering, casting and by other means will known to those skilled in the art. Bottles and containers may be made by any of the conventional methods such as blow extrusion, injection-molding, vacuum-forming, casting, etc. Where the films of this invention are subjected to uniaxial or biaxial orientation, still further improvements in the water vapor transmission rate are noted.

This invention also contemplates the use of conventional additives such as dyes, fillers, pigments, plasticizers, stabilizers, etc., in the packaging materials of this invention.

The following examples are given in illustration of the invention and are not to be construed as limitations thereof. All parts and percentages are by weight unless otherwise indicated.

EXAMPLE I 400 g. of water is placed in a suitable reaction vessel and 11.5 g. of Triton X-200 and 1.6 g. of Triton X-100 are dissolved therein. (Triton X-100 and Triton X-200 are commercially available nonionic surfactants produced by the Rohm and Haas Corporation. Triton X-100 is understood to be isooctyl phenyl polyethoxy ethanol and Triton X-200 is understood to be the sodium salt of an alkylaryl polyether sulfonate). Next is added 37 g. of a 4 percent aqueous solution of potassium persulfate followed by 1.9 g. of dipentene. Finally, 162 g. of methacrylonitrile and 32 g. of isobutylene are introduced into the solution. The polymerization reaction is carried out for 19 hours at 60°C. under agitation, forming a stable emulsion having a solids content of 24.2 percent. 0.582 g. of 2,6-di-t-butyl p-cresol is added and then the residual monomers are removed by stripping. After stripping, the resin is freeze-coagulated and then thoroughly washed with water, followed by a methanol wash, followed by another water wash. A film of the resulting material is found to be clear and transparent and, under tensile stress, fails at 12,000 p.s.i. and 9 percent elongation.

EXAMPLE II

The material prepared in Example I is divided into two portions. Portion I is subjected to mill-rolling prior to sheet formation with a heated hydraulic press. Portion II is not mill-rolled but is merely sheeted with the heated press. The oxygen permeability of Portion I is found to be 0.18 and that of Portion II is found to be 0.22. The units are in cc.'s per 100 sq. in. 24 hr. atmos. mil in both cases. Testing is carried out according to ASTM procedure D 1434—63. The water vapor transmission is also measured on the samples according to ASTM procedure E 96—63T. The WVT of Portion I at 100°F. and 95 percent R.H. is 2.2 g./24 hr. 100 sq.in. mil while that of Portion II is 3.1 g./24 hr. 100 sq.in. mil. A film of Portion II after being subjected to biaxial orientation by heat shrinkage while in a secured condition is found to have a water vapor transmission rate of 2.15 g./24 hr. 100 sq.in. mil at 100°F. and 95 percent R.H.

The WVT rate is given in terms of grams of water transmitted through a film having a thickness of 1 mil and an area of 100 sq.in. in a 24 hr. period wherein the ambient conditions are maintained at 100°F. and 95 percent relative humidity (R.H.). The oxygen permeability rate is given in terms of cubic centimeters of oxygen which permeate through a film having a thickness of 1 mil and an area of 100 sq.in. during a 24 hr. period under 1 atmosphere (760 mm.) of oxygen at 73°F.

EXAMPLE III 60 g. of an 80/20 butadiene/acrylonitrile rubber latex containing 32 percent solids is charged to a reaction vessel. To this is added 350 g. of water, 11.5 g. of Triton X-200, 1.6 g. of Triton X-100, 37 g. of a 4 percent aqueous solution of potassium persulfate and 1.9 g. of dipentene. To this mixture is added 162 g. of methacrylonitrile and 32 g. of isobutylene. Polymerization is carried out under agitation for 19 hours at 60°C. 0.640 g. of 2,6-di-t-butyl p-cresol and 0.0576 g. of tris(nonylphenyl)phosphite are added to the emulsion. The reaction vessel is vented and excess monomer is removed by stripping. The solids content of the emulsion is 23.1 percent. The polymer is freeze-coagulated and given three washes in the sequence water-methanol-water. Upon pressing a film from the resin so formed, it is found to be water-white and transparent and, under tensile stress, fails at 9400 p.s.i. and 22 percent elongation.

The resin prepared in this manner is actually a mixture of methacrylonitrile and isobutylene grafted onto the rubber and ungrafted methacrylonitrile isobutylene copolymer. If desired, the grafted and ungrafted polymers may be separated from each other by ordinary physical means, e.g., means based upon the differing solubilities of the two parts. Of course, the ungrafted resin is essentially the same as that produced by Example I. The pure grafted resin will be found to have novel properties making it useful in various moldings, extruded products, films and the like.

EXAMPLE IV

The material prepared in Example III is divided into three portions:

Part A

The first portion of graft copolymer is subjected to mill-rolling prior to formation of the film by pressing. The film so prepared is then tested for oxygen permeability and water vapor transmission rate as described above. The oxygen permeability is found to be 1.20 and the water vapor transmission rate at 100°F. is found to be 3.3.

Part B

The second portion is treated in the same manner as the first except it is not subjected to mill-rolling. Here the oxygen permeability is found to be 0.33 and the water vapor transmission rate at 100°F. is 3.4. Another film of this portion, after being subjected to biaxial orientation by heat shrinkage while in a secured condition is found to have a water vapor transmission rate of 2.80 g./24 hr. 100 sq.in. mil at 100°F. and 95 percent R.H.

Part C

To the third portion was added enough of the copolymer of Example I to lower the rubber level of the blend to 10 percent. A film of this blend was found to have an oxygen permeability of 0.61 and a water vapor transmission rate of 2.8.

EXAMPLE V 320 g. of water is placed in a suitable reaction vessel and 11.5 g. of Triton X-200 and 1.6 g. of Triton X-100 are dissolved therein. Next is added 40 g. of a 4 percent aqueous solution of potassium persulfate followed by 3.32 g. of dipentene. Finally 162 g. of methacrylonitrile and 32 g. of isobutylene are introduced into the solution. The polymerization reaction is carried out for 19 hours at 60°C. under agitation, forming a stable emulsion. 0.582 g. of 2,6-di-t-butyl p-cresol is added and then the residual monomers are removed by stripping. After stripping, the resin is freeze-coagulated and given three washes in the sequence water-methanol-water. Upon pressing a film from the resin so formed, it is found to be water-white and of high clarity and, under tensile stress, fails at 12,000 p.s.i. and 10 percent elongation.

EXAMPLE VI 55 g. of a rubber latex comprising 70 weight percent butadiene, 25 weight percent acrylonitrile and 5 weight percent methyl acrylate and containing 33 percent solids is charged to the reaction vessel. To this is added 320 g. of water, 11.5 g. of Triton X-200, 1.6 g. of Triton X-100, 40 g. of a 4 percent aqueous solution of potassium persulfate and 2.4 g. of dipentene. To this mixture is added 162 g. of methacrylonitrile and 32 g. of isobutylene. Polymerization is carried out under agitation for 19 hours at 60°C. 0.0545 g. of tris(nonylphenyl)phosphite and 0.636 g. of 2,6-di-t-butyl p-cresol are added to the emulsion. The reaction vessel is vented and excess monomer is removed by stripping. The polymer is freeze-coagulated and given three washes in the sequence water-methanol-water. A film pressed from the resin so formed has high clarity, a tensile strength at "fail" of 9000 p.s.i., 40 percent elongation at "fail" and a tensile impact strength of 50 ft. lb./in.

EXAMPLE VII

Part A 220 g. of a rubber latex comprising 70 weight percent butadiene and 30 weight percent acrylonitrile and containing 33 percent solids is charged to the reaction vessel. To this is added 200 g. of water, 11.5 g. of Triton X-200, 1.6 g. of Triton X-100, 47.5 g. of a 4 percent aqueous solution of potassium persulfate and 2.4 g. of dipentene. To this mixture is added 81 g. of methacrylonitrile and 16 g. of isobutylene. Polymerization is carried out under agitation for 19 hours at 60°C.

Part B 58.4 g. of water is placed in a second reaction vessel and 1.92 g. of Triton X-200 and 0.267 g. of Triton X-100 are dissolved therein. Next is added 7.92 g. of a 4 percent aqueous solution of potassium persulfate followed by 0.317 g. of dipentene. Finally, 27 g. of methacrylonitrile and 5.33 g. of isobutylene are introduced into the solution. The polymerization is carried out for 19 hours at 60°C. under agitation.

Part C

The materials produced in Parts A and B are combined, in toto. To the blend is added 1.4 g. of tris(nonylphenyl)phosphite and 0.405 g. of 2,6-di-t-butyl p-cresol. The excess monomers are removed by stripping. The polymer is freeze-coagulated and given three washes in the sequence of water-methanol-water. The product is a homogeneous polymer having high clarity, good barrier properties and improved impact and tensile strength.

EXAMPLE VIII

This example illustrates the preparation of bottles to be used in the packaging of food, medicines and related substances.

4 ounce (4 oz.) Boston Round bottles are prepared using the same polymers as those used to prepare the films in the preceding examples. The bottles are prepared using a blow extruder and a stock temperature of 450—500°F. to give bottles with an average wall thickness of 20 mils. Gas chromatograph tests indicated that these bottles have oxygen barrier properties equal to their film counterparts.

It is obvious that many deviations may be made in the products and processes set forth above without departing from the scope of this invention.

We claim:

1. Foodstuffs, medicines and other related substances in a package formed from a resin which exhibits oxygen permeability of less than 6.5 cc/100 sq.in. 24 hr. atmos. mil at 73°F. and water vapor transmission of less than 8.5 g./24 hr. 100 sq.in. mil at 100°F. and 95 percent relative humidity, said resin selected from the group consisting of:
   A. The product of the copolymerization of methacrylonitrile and at least one lower alpha-mono-olefin having 2—8 carbon atoms, wherein the methacrylonitrile comprises from about 78 to about 98 weight percent of the copolymer; and
   B. a blend of the product of A with the product of the graft polymerization onto a preformed rubber substrate of a monomer mixture of 78—98 weight percent methacrylonitrile and, correspondingly, 22—2 weight percent of at least one lower alpha-mono-olefin having 2—8 carbon atoms; the total methacrylonitrile of said blend constituting 55—90 weight percent; said package having been formed by molding the molten resin in an essentially solvent-free condition or by forming a sheet produced from the molten resin in an essentially solvent-free condition.

2. The combination of claim 1 wherein the preformed rubber substrate is comprised of a copolymer comprising butadiene and acrylonitrile.

3. The combination of claim 1 wherein the lower alpha-mono-olefin is isobutylene.

4. The combination of claim 1 wherein said package is uniaxially oriented.

5. The combination of claim 1 wherein said package is biaxially oriented.

6. The combination of claim 1 wherein particles of said resin are extruded into sheet material which is thermoformed into said package.

7. The combination of claim 1 wherein said package is a bottle.